Feb. 5, 1935.   S. J. KRIVIG   1,990,079
PRESS FOR BENDING TOOTH BACKING PLATES
Filed April 19, 1933
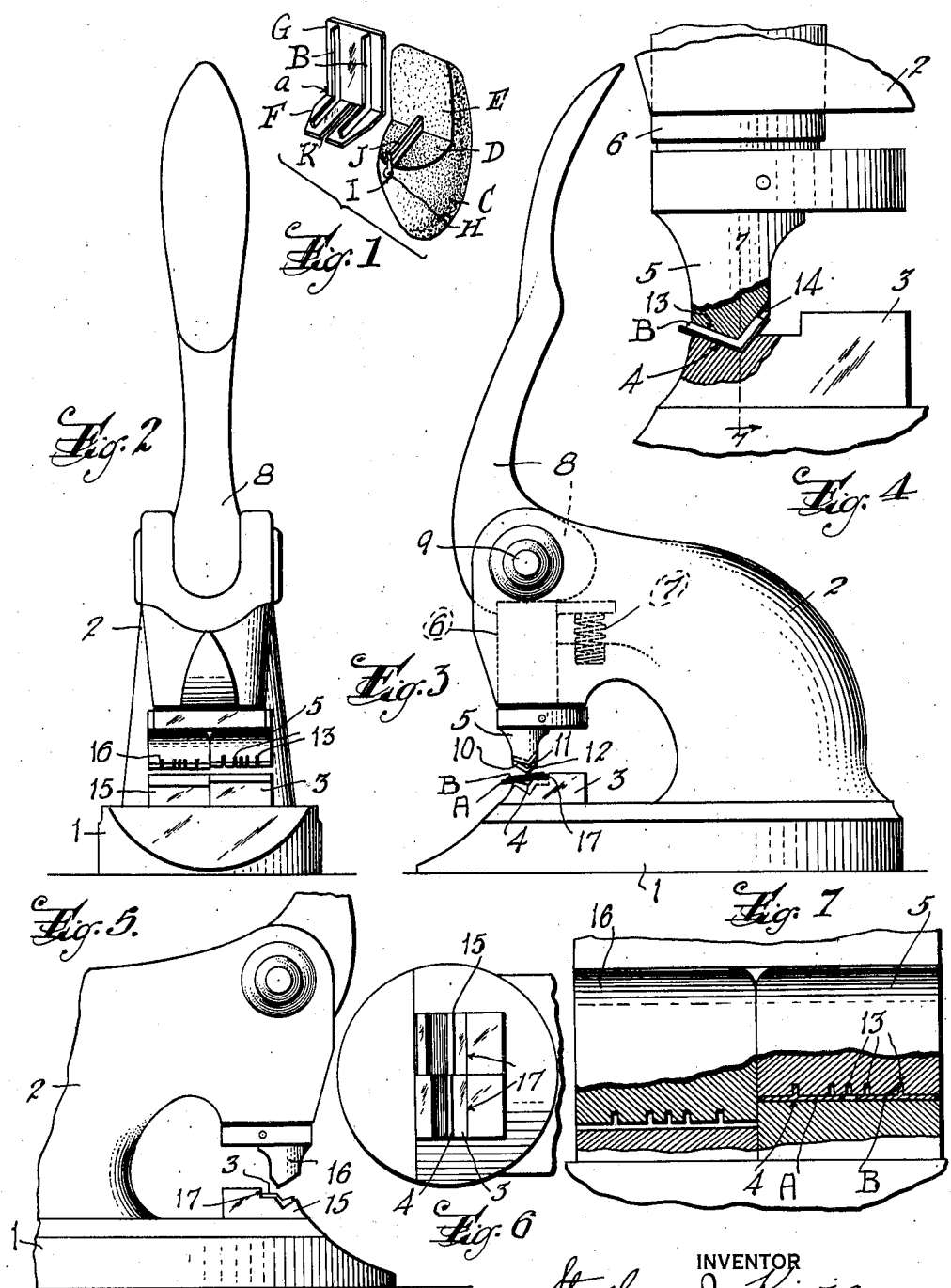

Patented Feb. 5, 1935

1,990,079

UNITED STATES PATENT OFFICE 1,990,079

PRESS FOR BENDING TOOTH BACKING PLATES

Stephen J. Krivig, Hillside, N. J., assignor to Baker & Company, Inc., Newark, N. J., a corporation of New Jersey Application April 19, 1933, Serial No. 666,919

1 Claim. (Cl. 153—21)

This invention relates in general to presses and more particularly to a press especially adapted for use in bending artificial tooth backing plates which are secured to the lingual sides of the teeth for soldering or casting the teeth on a denture, such as a bridge.

Artificial teeth are made with their lingual surfaces in at least two different forms, and accordingly tooth backing plates have also been made in different forms corresponding to the teeth. One form of tooth has its whole lingual surface substantially in one flat plane which requires a substantially flat backing plate all portions of which are in substantially the same plane. Another form of tooth commonly known as a pontic tooth has its lingual side composed of two flat surfaces angularly disposed with respect to each other, which requires a correspondingly shaped backing plate having angularly related portions.

One object of my invention is to provide a novel and improved press for use by dentists or dental technicians in their laboratories for bending a flat backing plate into suitable shape for use with a pontic tooth having its lingual side composed of two surfaces arranged in angularly disposed planes, so that a backing plate can be made initially in flat condition to fit a tooth having its lingual side composed of a single flat surface, and can be so used, or said backing plate can be bent by said press for use on a pontic tooth, as desired, whereby the necessity for carrying in stock two kinds of backing plates shall be eliminated.

One type of flat backing plate now manufactured has a plurality of ribs on the side thereof which is to be connected to a denture, said ribs reenforcing the plate and serving as gauges for applying solder to the plate as well as restraining running of solder from the plate. This is a desirable type of plate, and accordingly another object of my invention is to provide a press embodying novel and improved features of construction whereby such a plate including said ribs can be easily and accurately bent to fit a pontic tooth without distortion of ribs or plate.

In carrying out my invention I contemplate a press of the character described comprising a pair of cooperating dies to relatively reciprocate toward and from each other and receive between them a plate to be bent having ribs on one side thereof, one of said dies having a V-shaped groove the angular relation of the sides of which correspond to the angular relation of the portions of the plate which it is desired to produce, and the other die having a head formed with sides which are parallel to said side of said groove and meet in a line in a common plane with the line of meeting of the sides of said groove, the second die also having a plurality of transverse grooves in its said sides to receive said ribs on said plate, the bases of said grooves being parallel to the plane of the respective sides of said head and the grooves being of a depth and width equal to the height and width respectively of said ribs on said plate, each groove in one side of the head being alined with one groove in the other side, whereby said plate and said ribs can be simultaneously and accurately bent between said dies into the desired shape.

Other objects are to provide such a press which shall be simple and inexpensive in construction and operation; and to obtain other results and advantages as will be brought out by the following description.

Referring to the accompanying drawing in which corresponding and like parts are designated throughout the several views by the same reference characters, Figure 1 is a composite perspective view of an artificial tooth and a tooth backing for shaping of which my press is designed.

Figure 2 is a front elevation of a press embodying my invention.

Figure 3 is a side elevation thereof.

Figure 4 is an enlarged fragmentary side elevation partially in section, of the two dies showing them in cooperating relation and bending a plate.

Figure 5 is a view similar to Figure 3 showing the other side of the press.

Figure 6 is a top plan view of the bed die block, and

Figure 7 is a vertical sectional view on the line 7—7 of Figure 4.

For a clear understanding of my invention, I shall first describe the plate for bending of which my press is designed. This plate is designated A on the drawing and is formed of sheet metal, the plate initially being flat and having longitudinal solid ribs B on one side thereof as shown in Figure 3. To adapt this plate for use with a so-called pontic tooth which is designated C in Figure 1, it is necessary to bend the plate. This pontic tooth has its lingual side formed with two surfaces D and E angularly disposed with relation to each other, and the backing plate is applied to the surface and must conform thereto. Accordingly the flat backing plate A must be bent transversely along the line $a$ to form two portions F and G corresponding to the two portions D and E of the tooth, and the ribs B must also be bent along the same line. The backing plate cooperates with a post H which fits an undercut groove I in the tooth and has a web J to enter a slot K in the portion F of the backing plate, solder being applied to the backing plate over the web J for securing the plate to the post and attaching the whole backing to a denture. The plate is also cemented to the surfaces D and E of the tooth in the usual manner.

My press comprises a base 1 which has a gooseneck standard 2 projecting upwardly therefrom and overhanging a portion of the base. A die block 3 is mounted on the base 1 and has in its top surface a V-shaped groove 4.

With the die block 3 cooperates a head die 5 which is connected to a ram 6 that in turn is slidably mounted in the goose-neck 2 above the die block 3 so that the head block 5 may reciprocate toward and from the die 3. The ram 6 is normally influenced upwardly to move the head die 5 away from the die 3 by a compression spring 7, and a handled cam 8 is pivotally mounted at 9 on the goose-neck for moving the ram 6 and head die 5 toward the bed die 3.

The head die 5 has two sides 10 and 11 which are parallel to the respective sides of the V-shaped groove 4 and meet in a line 12 which is in a common plane with the line of meeting of the sides of the groove 4. The head die 5 has transverse grooves 13 and 14 in the respective sides thereof to receive the ribs B of the backing plate. Each groove 13 is in alinement with and merges into one groove 14, and the bases of the grooves are parallel to the planes of the respective sides 10 and 11 of the die. Also, the grooves are of a depth and width substantially equal to the height and width respectively of the ribs B on the backing plate. A plurality of grooves 13 and 14 are provided corresponding in number to the maximum number of ribs B on the plates to be bent, it being understood that different plates have different numbers of ribs B. The spacing of the ribs on different plates is also different and the spacing of the slots 13 and 14 corresponds with the spacing of said ribs.

In operation of the press, a flat backing plate A is placed upon the top surface of the bed die 3 as shown in Figure 3 with the ribs B of the plate alined with the slots 13 and 14. Thereupon the handle 8 is swung downwardly to cause the head die 5 to move into engagement with the plate and to force the plate into the groove 4, as shown in Figure 4 of the drawing. This action causes the plate to be bent along the line a, and the ribs B are bent simultaneously with the bending of the plate, accurately and without any distortion or tearing of the ribs from the plate, due to contact of the bases and sides of the grooves 13 with the tops and sides of said ribs simultaneously with contact of the other portions of the head with the other portions of the plate. This is an important feature, since to bend a flat plate with ribs thereon, in such a manner as to avoid distortion of the ribs and/or plate and prevent tearing of the ribs from the plate, was a serious problem which my invention has solved. Upon release of the handle 8 the spring 7 will raise the head die 5 so that the bent plate can be removed.

The angular relation of the sides of the groove 4 and the sides of the head die, will correspond to the desired angular relation of the portions F and G of the bent plate. Inasmuch as different pontic teeth require backing plates having the angularly disposed portions at different angles to each other, I have shown a second pair of dies 15 and 16 corresponding to the dies 3 and 5, but having the sides of the groove in the bed die and the sides of the head die disposed at different angular relations than the sides of the groove 4 and the head die 5. The die 15 may be mounted on the bed of the press adjacent the die block 3, while the die 16 may be mounted on the ram 6 adjacent the die 5. With this arrangement, the same press may be utilized for bending flat plates into different shapes.

For the purpose of locating the plates so that they will be bent at the proper point, the bed dies 3 and 15 may be provided with gauge shoulders 17 against which one end of the plate to be bent may abut as the plate is placed on the bed die 3.

The press is simple in construction and operation and is especially adapted for use by dentists and dental technicians. With the press, the dentist need carry in stock only one type of backing plate, that is, a flat backing plate, which can be easily and quickly bent into a plate for a pontic tooth.

Having thus described my invention, what I claim is:

A press for transversely bending a flat plate having solid longitudinal ribs on one side thereof, said press comprising a pair of cooperating die members reciprocable toward and from each other to receive said plate between them, one of said die members having a V-shaped groove, and the other die member having a head formed with sides which are parallel to the respective sides of said groove and meet in a line in a common plane with the line of meeting of the sides of said groove, the second die member also having transverse grooves to receive said ribs on said plate, the bases of said grooves being parallel to the planes of the respective sides of said head and said grooves being of the same cross-sectional shape as said ribs and of a depth and of a width substantially equal to the height and width respectively of said ribs, each groove in one side being alined with and merging into one groove in the other side so that the bases and sides of said grooves will contact with the tops and sides of the ribs simultaneously with the contact of the other portions of the head with the other portions of such plate, and means for relatively moving said die members toward and from each other, whereby upon movement of said die members toward each other with such a plate between them, said plate and said ribs will be simultaneously and accurately bent transverely.

STEPHEN J. KRIVIG.